US009122136B2

(12) United States Patent
Tang

(10) Patent No.: US 9,122,136 B2
(45) Date of Patent: Sep. 1, 2015

(54) TOY IMAGE PROJECTOR

(71) Applicant: PRO TV ELECTRONICS INC., Taipei (TW)

(72) Inventor: Jack Tang, New Taipei (TW)

(73) Assignee: PRO TV ELECTRONICS INC., Taipei (TW)

( * ) Notice: Subject to any disclaimer, the term of this patent is extended or adjusted under 35 U.S.C. 154(b) by 153 days.

(21) Appl. No.: 14/055,307

(22) Filed: Oct. 16, 2013

(65) Prior Publication Data

US 2015/0049312 A1     Feb. 19, 2015

(30) Foreign Application Priority Data

Aug. 13, 2013   (TW) .............................. 102215201 U

(51) Int. Cl.
*G03B 21/14*     (2006.01)
*A63H 33/22*     (2006.01)

(52) U.S. Cl.
CPC .............. *G03B 21/145* (2013.01); *A63H 33/22* (2013.01); *G03B 21/142* (2013.01)

(58) Field of Classification Search
USPC .................... 353/1, 2, 62, 119, 120; 352/101; 362/125, 806
See application file for complete search history.

(56) References Cited

U.S. PATENT DOCUMENTS

| 1,590,743 | A | * | 6/1926 | Hanstine | 352/101 |
| 4,827,382 | A | * | 5/1989 | Feliks | 362/35 |
| 4,858,079 | A | * | 8/1989 | Ohashi | 362/35 |
| 8,827,496 | B2 | * | 9/2014 | VanderSchuit | 362/277 |
| 2002/0105808 | A1 | * | 8/2002 | Ting Yup | 362/281 |
| 2009/0296048 | A1 | * | 12/2009 | Hong | 353/62 |
| 2010/0277952 | A1 | * | 11/2010 | Chien | 362/641 |
| 2012/0057370 | A1 | * | 3/2012 | Chien | 362/640 |

* cited by examiner

*Primary Examiner* — William C Dowling
(74) *Attorney, Agent, or Firm* — Muncy, Geissler, Olds & Lowe, P.C.

(57) ABSTRACT

A toy image projector includes a housing including a peripheral wall, an accommodation chamber surrounded by the peripheral wall and a transparent view window at the peripheral wall, a rotating body accommodated in the accommodation chamber and including a peripheral wall, multiple sets of patterned holes formed in the peripheral wall and a space surrounded by the peripheral wall, a driving mechanism operable to rotate the rotating body relative to the housing, and a light-emitting device accommodated in the space within the rotating body and adapted to emit light through one set of patterned holes and the transparent view window to the outside. Thus, by means of rotating the rotating body, different image patterns can be projected to the outside of the toy image projector, increasing consumer interest in playing the toy image projector.

9 Claims, 6 Drawing Sheets

TOY IMAGE PROJECTOR

BACKGROUND OF THE INVENTION

1. Field of the Invention

The present invention relates to image projection technology, and more particularly, to a toy image projector that is operable to selectively project one of a series of image patterns.

2. Description of the Related Art

The structural designs of conventional toy image projectors mostly focus on the external shape of the projector without improving the projection pattern, for example, simply making the projector in the shape of a flashlight or pistol. As a consequence, conventional toy image projectors are monotonous when playing, and can simply project one single image pattern. If a user wishes to project different image patterns, he or she must buy multiple toy image projectors, not only increasing the cost but also requiring much storage space.

SUMMARY OF THE INVENTION

The present invention has been accomplished under the circumstances in view. It is the main object of the present invention to provide a toy image projector, which is operable to selectively projecting one of a series of image patterns.

To achieve this and other objects of the present invention, a toy image projector of the invention comprises a housing, a rotating body, a driving mechanism, and a light-emitting device. The housing comprises a peripheral wall, an accommodation chamber surrounded by the peripheral wall, and a transparent view window located at the peripheral wall. The rotating body is accommodated in the accommodation chamber of the housing, comprising a peripheral wall, multiple sets of patterned holes formed in the peripheral wall, and a space surrounded by the peripheral wall. The driving mechanism is adapted for providing an external force to rotate the rotating body relative to the housing within the accommodation chamber. The light-emitting device is accommodated in the space within the rotating body, defining a light-emitting side facing toward the transparent view window of the housing. The light-emitting device is adapted to emit light through one of the multiple sets of patterned holes and the transparent view window of the housing toward the outside.

The toy image projector further comprises a lock means adapted to lock the rotating body to the housing. The lock means comprises a protruding rod extended to the inside of the accommodation chamber of the housing. Further, the rotating body comprises a bottom wall connected to the peripheral wall thereof, and a plurality of recessed portions located at the bottom wall. The protruding rod of the lock means is insertable into one recessed portion of the rotating body to lock the rotating body to the housing. Thus, by means of locking the rotating body to the housing, one set of patterned holes is set in position for projection.

In one embodiment of the present invention, the lock means comprises a locking member carrying the protruding rod, and a compression spring mounted around the locking member. The protruding rod is movable by the bottom wall of the rotating body in direction away from the accommodation chamber of the housing. The compression spring is adapted to provide a restoring force to the locking member to force the protruding rod into one recessed portion upon alignment between the protruding rod and the respective recessed portion.

Further, the housing comprises an accommodation recess. Further, the rotating body comprises a bottom wall connected to the peripheral wall thereof, and a bottom stub tube extended from the bottom wall and positioned in the accommodation recess of the housing to prevent displacement of the rotating body in the accommodation chamber of the housing.

Further, the driving mechanism comprises a rotating knob inserted through the peripheral wall of the housing, a driving gear connected to and rotatable by the rotating knob. Further, the rotating body comprises a barrel carrying the peripheral wall of the rotating body, and a top cap connected to the barrel. The top cap comprises a transmission gear meshed with the driving gear. Thus, operating the rotating knob can rotate the rotating body.

Other advantages and features of the present invention will be fully understood by reference to the following specification in conjunction with the accompanying drawings, in which like reference signs denote like components of structure.

DETAILED DESCRIPTION OF THE INVENTION

First, the applicant needs to explain that in this description, the upper, lower, top, bottom and other relevant directional adjectives are based on the direction illustrated in the annexed drawings.

Figure 1:
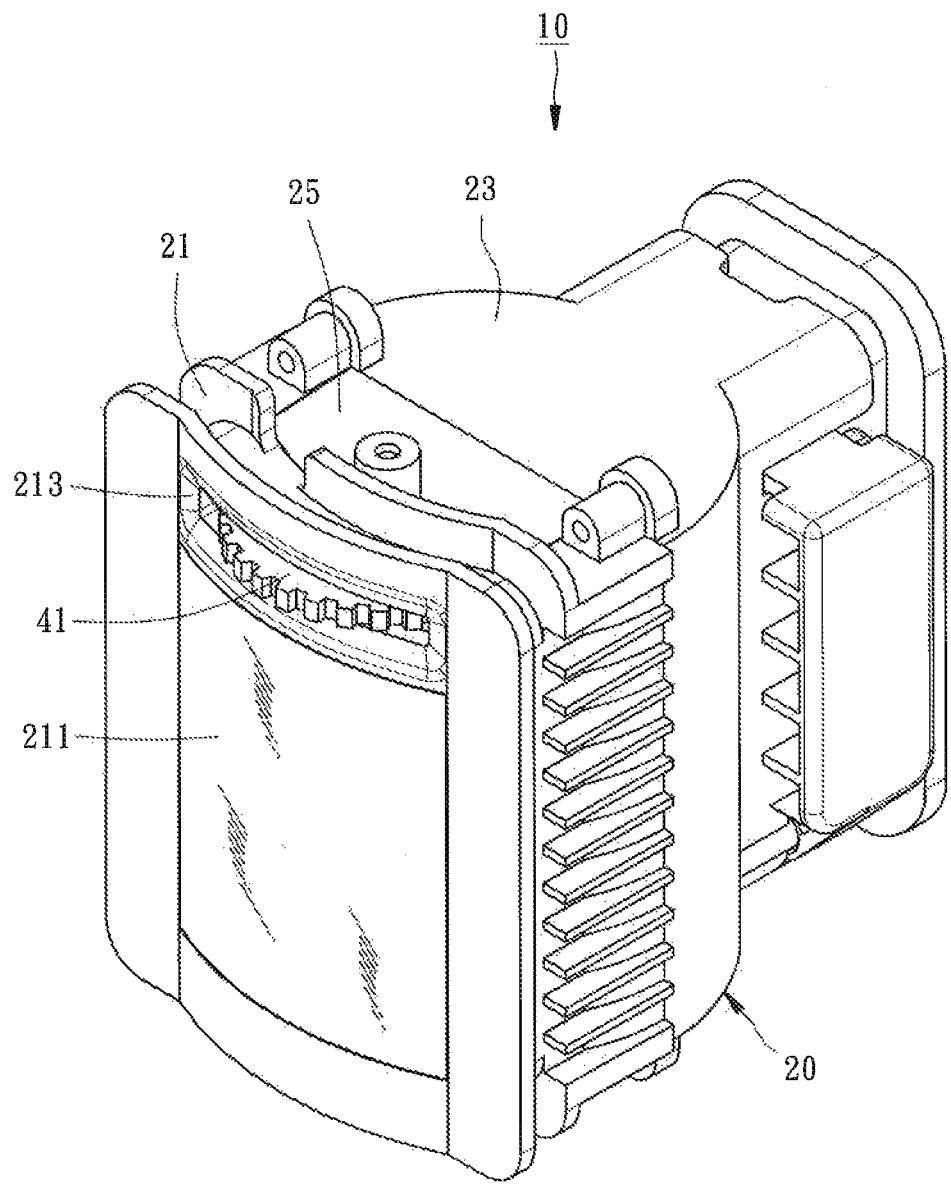
FIG. 1 is an oblique top elevational view of a toy image projector in accordance with the present invention.
Figure 2:
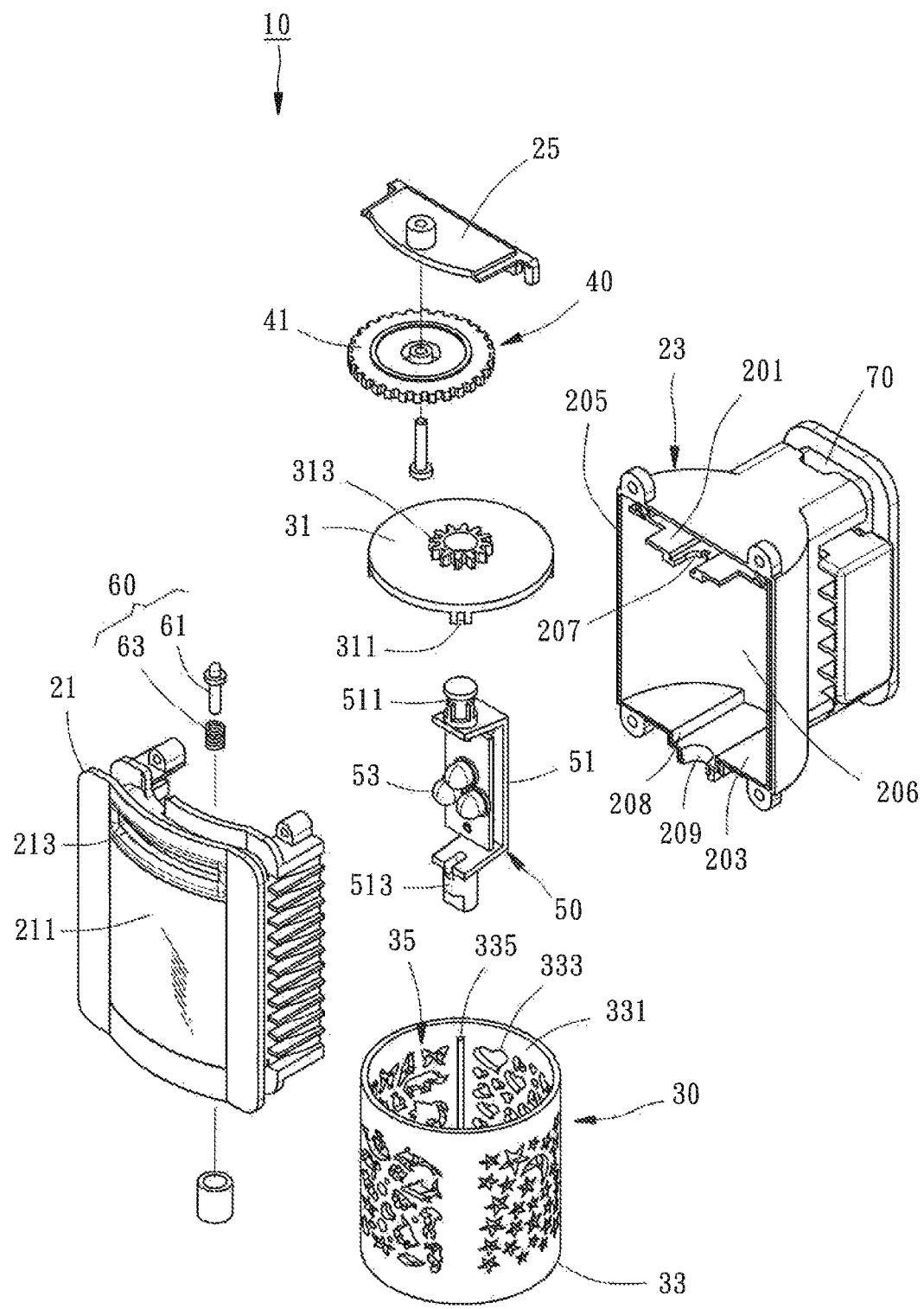
FIG. 2 is an exploded view of the toy image projector in accordance with the present invention.
Figure 3:
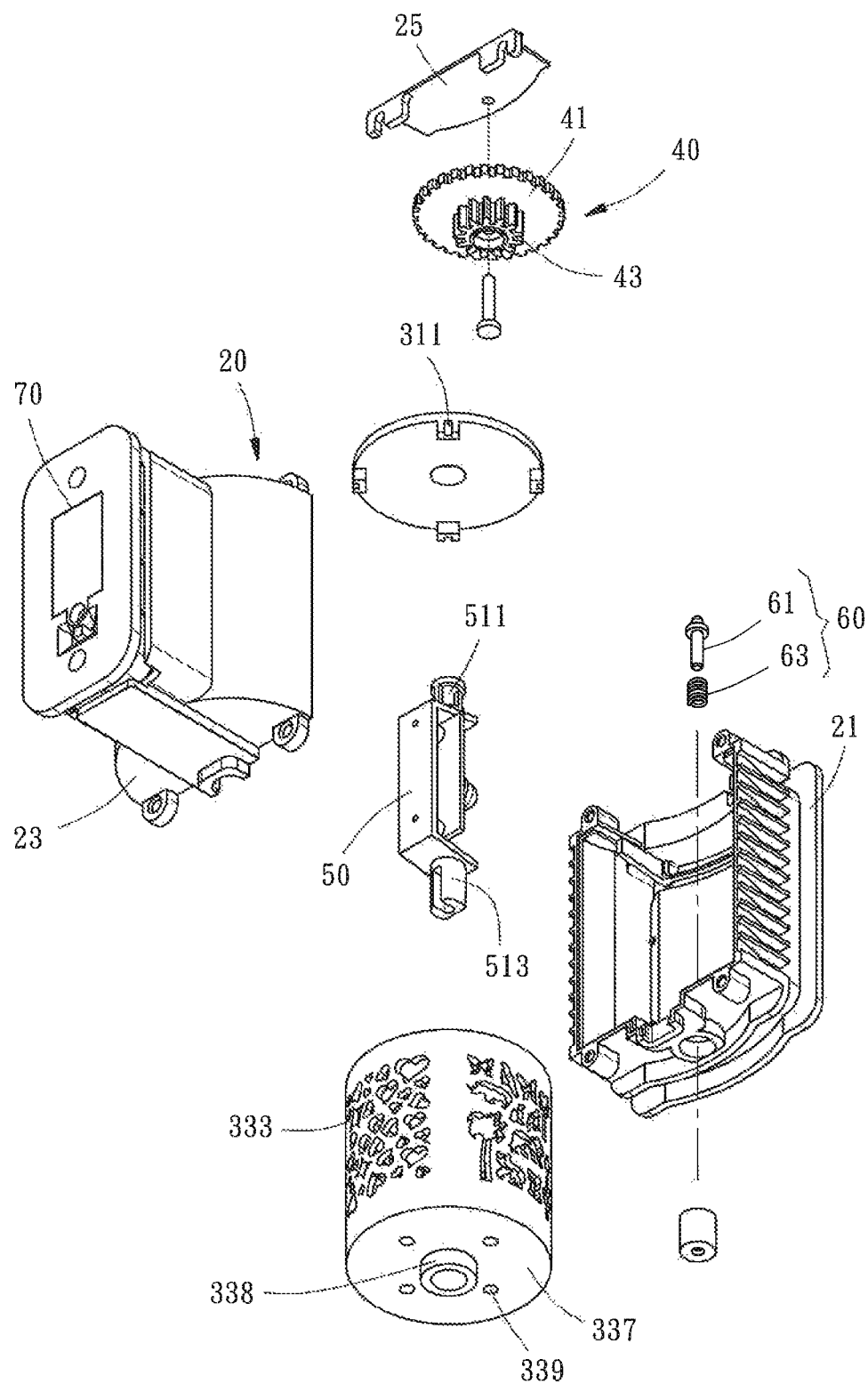
FIG. 3 is another exploded view of the toy image projector in accordance with the present invention.

Referring to FIGS. 1-3, a toy image projector 10 in accordance with the present invention is shown. The toy image projector 10 comprises a housing 20, a rotating body 30, a driving mechanism 40, and a light-emitting device 50.

Figure 6:
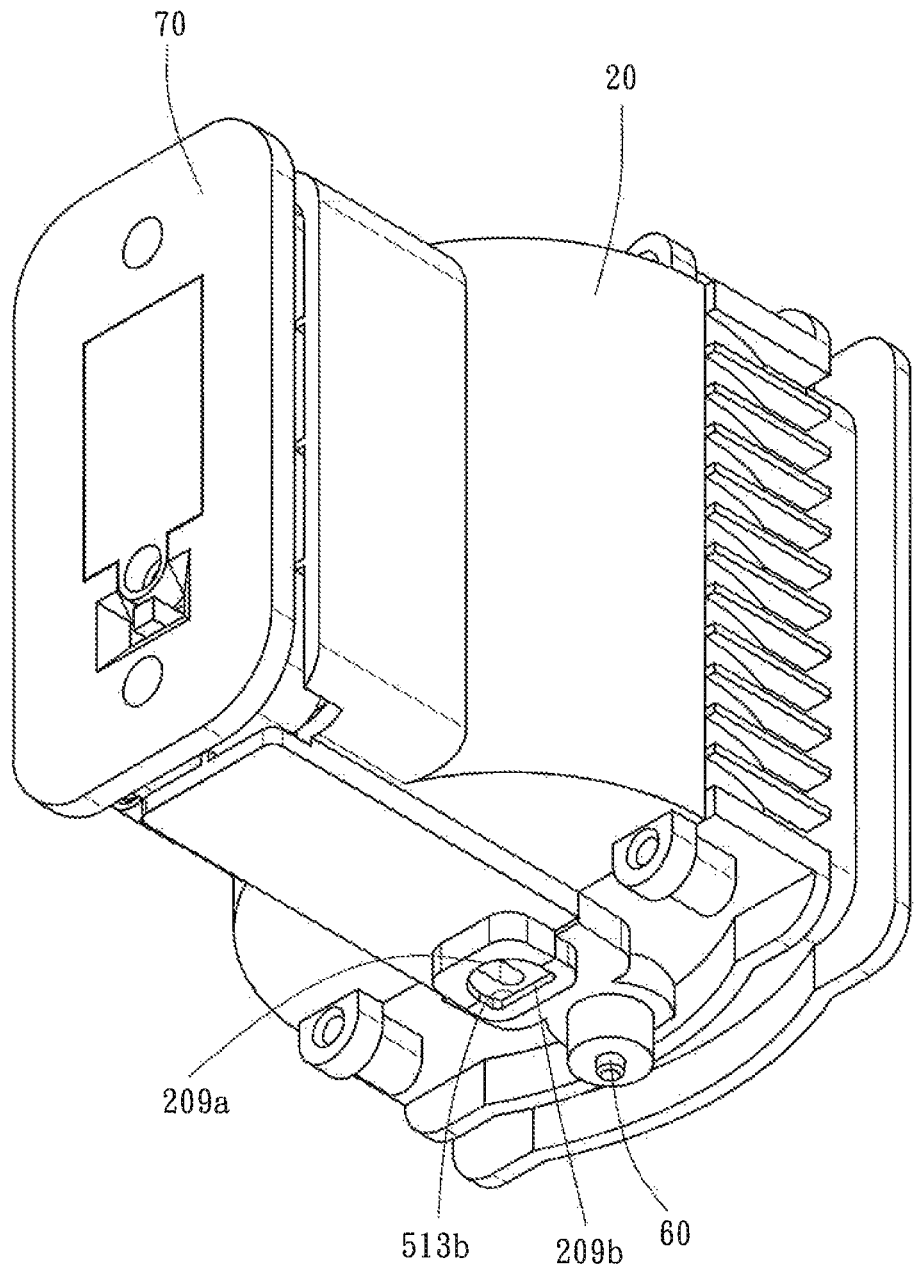
FIG. 6 is an oblique bottom elevational view of the toy image projector in accordance with the present invention.

The housing 20 comprises a front housing body 21, a rear housing body 23, and a top cover 25. When the front housing body 21, the rear housing body 23 and the top cover 25 are assembled together, the housing 20 defines a top wall 201, a bottom wall 203, a peripheral wall 205, and an accommodation chamber 206. As illustrated in FIG. 2, the top wall 201 defines a mounting notch 207; the bottom wall 203 defines an accommodation recess 208 and a locating hole 209 in communication with the accommodation chamber 206. Further, as shown in FIG. 6, the hole wall of the locating hole 209 defines an arched segment 209a and a flat segment 209b. Further, as shown in FIG. 2, the front housing body 21 provides a transparent view window 211, and an elongated slot 213 located at a top side of the transparent view window 211.

Figure 4:
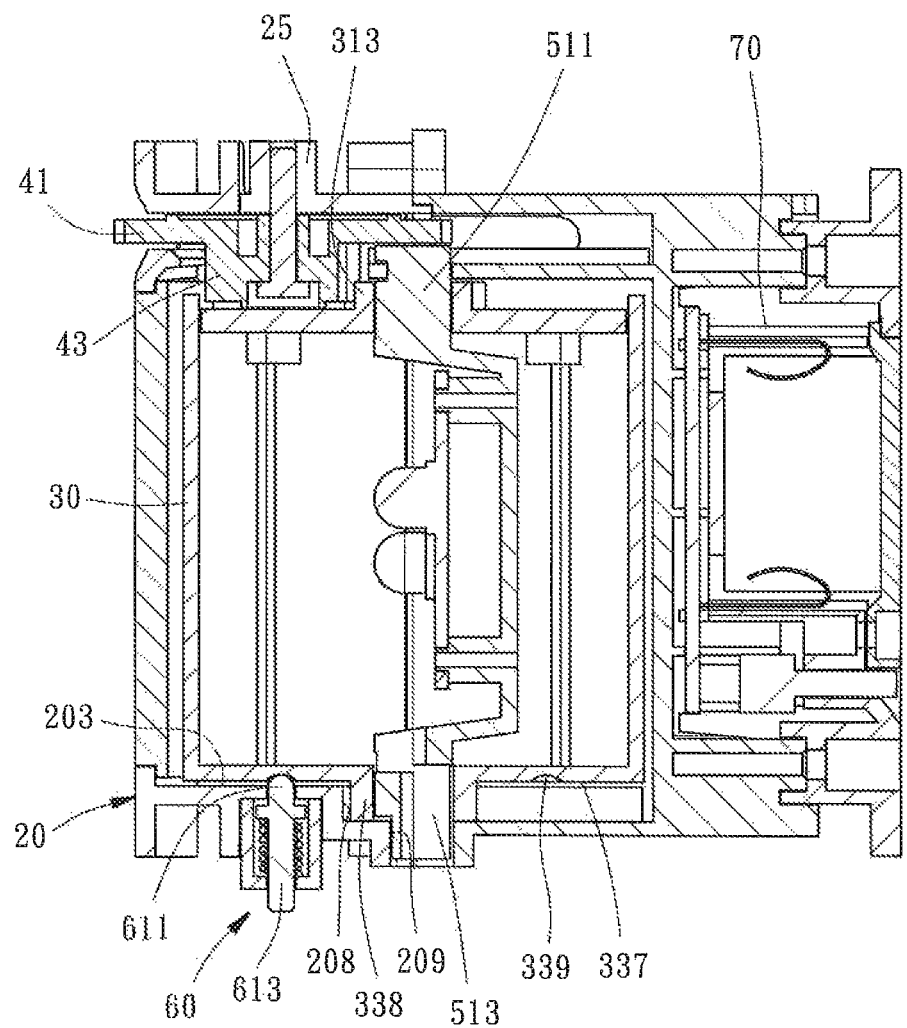
FIG. 4 is a sectional view of the toy image projector in accordance with the present invention.
Figure 5:
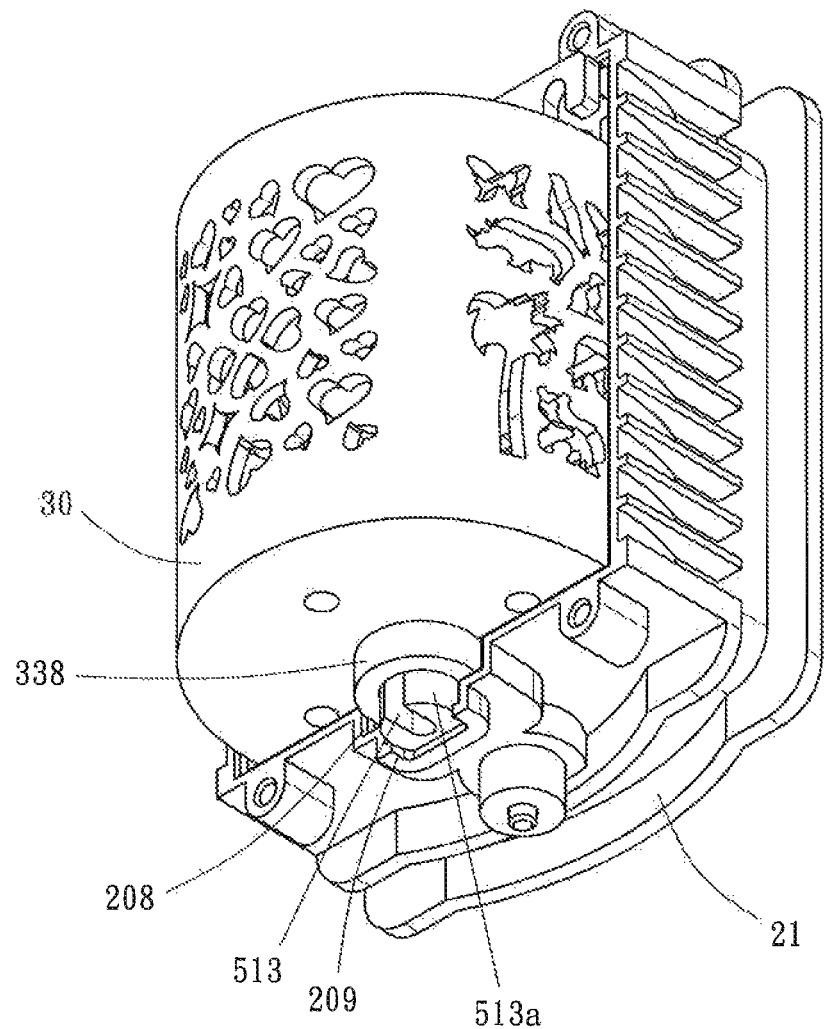
FIG. 5 is a sectional elevation of the toy image projector in accordance with the present invention.

The rotating body 30 in this embodiment comprises a top cap 31 and a barrel 33. The top cap 31 and the barrel 33 define a space 35 therein. As shown in FIG. 3, the top cap 31 comprises a plurality of mounting grooves 311 equiangularly spaced around the border area thereof and facing toward a bottom side, and a transmission gear 313 coaxially located at a top wall thereof. As shown in FIG. 2 and FIG. 3, a through hole extends through the center of the top cap 31 and the center of the transmission gear 313. The barrel 33 comprises multiple sets of patterned holes 333 of different patterns cut through the peripheral wall 331 thereof, and a plurality of ribs 335 formed integral with the peripheral wall 331 and facing toward the space 35. The top cap 31 is capped on the barrel 33 to force the mounting grooves 311 into engagement with the respective ribs 335 tightly. The barrel 33 further comprises a bottom stub tube 338 downwardly extended from the center of a bottom wall 337 thereof. During installation, as shown in FIGS. 4 and 5, insert the bottom tub tube 338 of the barrel 33 into the accommodation recess 208 of the housing 20 to support the bottom wall 337 of the barrel 33 of the rotating body 30 above the bottom wall 203 of the housing 20, allowing rotation of the rotating body 30 relative to the housing 20 and preventing displacement of the rotating body 30 in the accommodation chamber 206.

The driving mechanism 40, as shown in FIGS. 2 and 3, comprises a rotating knob 41, and a driving gear 43 fixedly connected to the rotating knob 41. During installation, as shown in FIGS. 1 and 4, affix the driving mechanism 40 to the top cover 25 with a screw, enabling the driving mechanism 40 to be received in the space within the front housing body 21 and the top cover 25. After installation, the rotating knob 41 is partially extended out of the elongated slot 213, and the transmission gear 313 of the rotating body 30 is meshed with the driving gear 43. Thus, when rotating the rotating knob 41, the driving gear 43 will rotate the transmission gear 313, causing rotation of the rotating body 30 in the accommodation chamber 206 relative to the housing 20.

It is to be understood that the driving mechanism 40 is not limited to the above-described configuration, for example, the driving mechanism 40 can be a control shaft having its one end fixedly connected to the rotating body 30 and its other end extended out of the housing 20 for operation by a user to rotate the rotating body 30.

The light-emitting device 50 in this embodiment comprises a rack 51, and a plurality of light-emitting elements 53. The rack 51 comprises a mounting rod 511 and a plug rod 513 respectively and axially extended from opposing top and bottom ends thereof. As shown in FIG. 6, the plug rod 513 defines an arched portion 513a and a flat portion 513b. The light-emitting elements 53 are fixedly mounted in the rack 51 between the two opposing top and bottom ends of the rack 51. During installation, as shown in FIG. 2 and FIGS. 4-6, accommodate the light-emitting device 50 in the space 35 within the rotating body 30 to keep the light-emitting side of the light-emitting device 50 facing toward the transparent view window 211, enabling the mounting rod 511 to pass through the through hole in the top cap 31 and to engage into the mounting notch 207 and the plug rod 513 to pass through the bottom stub tube 338 and engage into the locating hole 209. At this time, the arched portion 513a and flat portion 513b of the plug rod 513 are respectively abutted against the arched segment 209a and flat segment 209b of the locating hole 209, the light-emitting device 50 and the rotating body 30 are arranged in a coaxial manner, however, the light-emitting device 50 is not rotatable with the rotating body 30. Thus, the light emitted by the light-emitting device 50 can go through the patterned holes 333 and the transparent view window 211 of the housing 20 to the outside.

It is to be noted that, as shown in FIG. 2 and FIG. 3, the toy image projector 10 further comprises a lock means 60. The lock means 60 in this embodiment is mounted in the housing 20. More specifically, the lock means 60 in this embodiment comprises (but not limited to) a locking member 61 and a compression spring 63. The lock means 60 can be fixedly mounted in the front housing body 21 adjacent to the accommodation recess 208 by means of a cylinder. As shown in FIG. 4, the locking member 61 comprises a protruding rod 611 and a shank body 613. The protruding rod 611 is suspending in the accommodation chamber 206. The compression spring 63 is mounted around the shank body 613. Further, as shown in FIG. 3, the barrel 33 of the rotating body 30 further comprises a plurality of recessed portions 339 located at the bottom wall 337 outside the space 35 and corresponding to the multiple sets of patterned holes 333.

Thus, when the protruding rod 611 of the locking member 61 is forced by the bottom wall 337 of the rotating body 30 to move downward, the rotating body 30 can be rotated relative to the housing 20; when the protruding rod 611 is moved into alignment with one recessed portion 339, the protruding rod 611 can be forced into the recessed portion 339 by the restoring force of the compression spring 63 to lock the rotating body 30. Thus, the user can lock the pattern to be projected through the transparent view window 211.

It is to be noted that the lock means 60 is not limited to the above-described configuration. For example, the lock means 60 can simply comprises a protruding rod upwardly extended from the bottom wall 203 of the housing 20. In this case, the rotating body 30 can be made of a flexible material. When the bottom wall 337 of the rotating body 30 pushes the protruding rod, the rotating body 30 is slightly and elastically deformed and keeps rotating. As soon as one recessed portion 339 is moved into alignment with the protruding rod, the protruding rod will be forced into the recessed portion 339 to lock the rotary body 30.

Further, the power source for the light-emitting device 50 of the toy image projector 10, can be, for example, as shown in FIG. 2, a battery box 70 that is mounted in the rear housing body 23.

In conclusion, the invention provides a toy image projector, which uses a rotating body having multiple sets of patterned holes formed in the periphery thereof. When compared with conventional toy projectors that can simply project one single image pattern, the toy image projector of the invention can selectively project multiple image patterns, increasing consumer interest in playing the toy image projector. Further, a consumer simply needs to purchase one single toy image projector to obtain multiple image patterns. Therefore, the invention also has the benefits of reducing costs and to avoiding occupation of extra storage space.

What is claimed is:

1. A toy image projector, comprising:
   a housing comprising a peripheral wall, an accommodation chamber surrounded by said peripheral wall, and a transparent view window located at said peripheral wall;
   a rotating body accommodated in said accommodation chamber of said housing, said rotating body comprising a peripheral wall, multiple sets of patterned holes formed in the peripheral wall of said rotating body, and a space surrounded by the peripheral wall of said rotating body;
   a driving mechanism adapted for providing an external force to rotate said rotating body relative to said housing within said accommodation chamber; and
   a light-emitting device accommodated in said space within said rotating body, said light-emitting device defining a light-emitting side facing toward said transparent view window of said housing, said light-emitting device being adapted to emit light through one said set of patterned holes and said transparent view window of said housing toward the outside.

2. The toy image projector as claimed in claim 1, further comprising a lock means, said lock means comprising a protruding rod extended to the inside of said accommodation chamber of said housing, wherein said rotating body further comprises a bottom wall connected to the peripheral wall thereof, and a plurality of recessed portions located at said bottom wall; said protruding rod of said lock means is insertable into one said recessed portion of said rotating body to lock said rotating body to said housing.

3. The toy image projector as claimed in claim 2, wherein said lock means further comprising a locking member carrying said protruding rod, and a compression spring mounted around said locking member, said protruding rod being movable by said bottom wall of said rotating body in direction away from said accommodation chamber of said housing, said compression spring being adapted to provide a restoring force to said locking member to force said protruding rod into one said recessed portion upon alignment between said protruding rod and the respective said recessed portion.

4. The toy image projector as claimed in claim 1, wherein said housing comprises an accommodation recess; said rotating body comprises a bottom wall connected to the peripheral wall thereof, and a bottom stub tube extended from the bottom wall of said rotating body and positioned in said accommodation recess of said housing.

5. The toy image projector as claimed in claim 1, wherein said rotating body comprises a top cap and a barrel carrying the peripheral wall of said rotating body, said top cap comprising a mounting groove facing toward said barrel, said barrel comprising a rib located at the periphery of said rotating body and facing toward said space and engaged into said mounting groove.

6. The toy image projector as claimed in claim 1, wherein said driving mechanism comprises a rotating knob inserted through the peripheral wall of said housing, a driving gear connected to and rotatable by said rotating knob; said rotating body comprises a barrel carrying the peripheral wall of said rotating body, and a top cap connected to said barrel, said top cap comprising a transmission gear meshed with said driving gear.

7. The toy image projector as claimed in claim 1, wherein said light-emitting device comprises a rack fixedly mounted in said housing, and at least one light-emitting element mounted in said rack.

8. The toy image projector as claimed in claim 7, wherein said housing comprises a top wall and a bottom wall respectively connected to opposing top and bottom sides of the peripheral wall thereof, a mounting notch located at the top wall of said housing and a locating hole located at the bottom wall of said housing, said locating hole defining a hole wall, said hole wall defining an arched segment and a flat segment; said rack of said light-emitting device comprises a mounting rod axially located at one end thereof and coupled to said mounting notch, and a plug rod axially located at an opposite end thereof and fastened to said locating hole, said plug rod defining an arched portion and a flat portion respectively abutted against said arched segment and said flat segment.

9. The toy image projector as claimed in claim 8, wherein said rotating body comprises a top cap and a bottom respectively connected to opposing top and bottom sides of the peripheral wall thereof; said mounting rod and said plug rod of said rack of said light-emitting device are respectively inserted through the top cap and bottom wail of said rotating body and kept in a coaxial relationship relative to said rotating body.

* * * * *